United States Patent
Kojima et al.

[11] Patent Number: 5,982,604
[45] Date of Patent: Nov. 9, 1999

[54] POWER SUPPLY APPARATUS FOR ELECTRONIC CONTROL UNIT IN AUTOMOTIVE VEHICLE

[75] Inventors: Akio Kojima, Anjo; Mitsuhiro Saitou, Oobu; Kiyoshi Yamamoto, Toyohashi, all of Japan

[73] Assignee: Denso Corporation, Kariya, Japan

[21] Appl. No.: 09/044,258

[22] Filed: Mar. 19, 1998

[30] Foreign Application Priority Data

Mar. 19, 1997 [JP] Japan .................................. 9-066825

[51] Int. Cl.⁶ .................. H01H 47/00; H02M 3/335; G05F 1/44

[52] U.S. Cl. ............................. 361/159; 363/21; 323/2; 323/282

[58] Field of Search ........................... 361/152, 154–156, 361/159–160, 170, 187, 189, 190; 323/288, 282, 285; 307/10.6, 10.7; 363/21, 49

[56] References Cited

U.S. PATENT DOCUMENTS

| | | |
|---|---|---|
| 4,553,196 | 11/1985 | Tokuyama et al. . |
| 4,774,624 | 9/1988 | Qualich .................................. 361/159 |
| 5,323,100 | 6/1994 | Iketani ...................................... 320/13 |
| 5,371,667 | 12/1994 | Nakao et al. ............................ 363/124 |
| 5,502,370 | 3/1996 | Hall et al. ................................. 323/284 |

FOREIGN PATENT DOCUMENTS

| | | |
|---|---|---|
| 55-147979 | 11/1980 | Japan . |
| 2-007256 | 2/1990 | Japan . |
| 2-051334 | 2/1990 | Japan . |
| 2-133064 | 5/1990 | Japan . |
| 7-118908 | 12/1995 | Japan . |

OTHER PUBLICATIONS

Wood: "DC–to–DC Converters", Electronics Engineers' Handbook, 1975; pp. 15–60~15–61.

*Primary Examiner*—Jeffrey Gaffin
*Assistant Examiner*—Kim Huynh
*Attorney, Agent, or Firm*—Phillsbury Madison & Sutro LLP

[57] ABSTRACT

A power supply apparatus is provided for energizing an electronic control unit mounted on a vehicle having a battery and a starter switch. The apparatus includes a coil connected to the power supply line, and a switch which operates for selectively enabling a current to flow through the coil and cutting off the current through the coil. A control circuit operates for selectively changing the switch between an ON state and an OFF state when the starter switch assumes an ON position. The ON and OFF states alternate in accordance with predetermined delays.

11 Claims, 3 Drawing Sheets

POWER SUPPLY APPARATUS FOR ELECTRONIC CONTROL UNIT IN AUTOMOTIVE VEHICLE

BACKGROUND OF THE INVENTION

1. Field of the Invention

This invention relates to a power supply apparatus for an electronic control unit in an automotive vehicle.

2. Description of the Related Art

Most automotive vehicles have computer-based electronic control units (computer-based ECU's) for engine control such as spark timing control or fuel injection control. In general, the ECU's are powered by vehicle batteries. The ECU's are designed to normally operate at a power supply voltage in a predetermined range.

The automotive vehicles also have engine starters which can be powered by the vehicle batteries. When the starters are activated to start the engines, the power supply voltages to the ECU's tend to drop. In bad conditions, the power supply voltages drop below the predetermined range so that the ECU's can not operate normally.

To cope with such a problem, it is known that an electronic circuit able to operate at a low power supply voltage is provided separately from an ECU, and spark timing control and fuel injection control are implemented by the electronic circuit during the activation of an engine starter.

Electronics Engineer's Handbook, published by McGraw-Hill, Inc, 1989, pages 15–60 and 15–61, shows a boost dc—dc converter in which the positive terminal of a dc power source is connected to a first end of an inductor, and a second end of the inductor is connected to the anode of a freewheel diode (a flywheel diode) and a first terminal of a switch. The cathode of the freewheel diode is connected to a first end of a load. A second end of the load is connected to the negative terminal of the dc power source. A capacitor is connected across the load. A second terminal of the switch is connected to the negative terminal of the dc power source. The boost dc—dc converter can apply a voltage to the load which is higher than the voltage across the dc power source.

Japanese published examined patent application 7-118908 discloses a switching power supply circuit including a boost dc—dc converter and an oscillator. A switch in the boost dc—dc converter is periodically changed between an open state and a closed state by the output signal of the oscillator which has a variable duty cycle.

Japanese published unexamined patent application 2-51334 discloses a battery power supply apparatus including a battery used in powering both an engine starter and an engine controller. The apparatus of Japanese application 2-51334 has a boost dc—dc converter and an oscillator. A switch in the boost dc—dc converter is periodically changed between an open state and a closed state in response to the output signal of the oscillator. The apparatus of Japanese application 2-51334 also has a comparator serving to compare the output voltage of the boost dc—dc converter with a reference voltage. When the output voltage of the boost dc—dc converter exceeds the reference voltage, the comparator holds the switch in the open state to make ineffective the voltage boosting process.

Japanese published unexamined patent application 2-133064 discloses a boost dc—dc converter provided with first and second comparators. The first comparator responds to the output voltage of the boost dc—dc converter. The first comparator controls a switch in the boost dc—dc converter in response to the output voltage of the boost dc—dc converter. The second comparator responds to a current which flows through an inductor in the boost dc—dc converter when the switch is closed. The second comparator controls the switch in response to the current through the inductor.

SUMMARY OF THE INVENTION

It is an object of this invention to provide an improved power supply apparatus for an electronic control unit in an automotive vehicle.

A first aspect of this invention provides a power supply apparatus for feeding electric power to an electronic control unit (3) mounted on a vehicle having a battery (1) and a starter switch. (5), The apparatus comprises a power supply line (10) connected to the battery (1); a coil (11) connected to the power supply line (10);

switching means (12) for selectively enabling a current to flow through the coil (11) and cutting off the current through the coil (11). A control circuit (20) is also included for selectively changing the switching means (12) between an ON state and an OFF state when the starter switch (5) assumes an ON position. Finally, smoothing means are provided (15, 16) for smoothing a counter electromotive force voltage which occurs in the coil (11) when the switching means (12) is changed to the OFF state by the control circuit (20), and for generating a boost voltage from the counter electromotive force voltage and feeding the boost voltage to the electronic control unit (3).

Circuit (20) comprises means (21, 24) for inhibiting change of the switching means (12) between the ON state and the OFF state when the boost voltage is equal to or higher than a predetermined voltage.

Another aspect of this invention is based on the first aspect, and provides a power supply apparatus wherein the electronic control unit (3) has a battery terminal (Batt) connected to the battery (1) and a boost voltage terminal (+B) subjected to the boost voltage. The apparatus further comprises voltage detection means (21) for detecting the boost voltage, and boost control means (24) for suspending operation of the control circuit (20) when the boost voltage detected by the voltage detection means (21) is equal to or higher than a predetermined voltage.

DESCRIPTION OF THE PREFERRED EMBODIMENT

Figure 1:
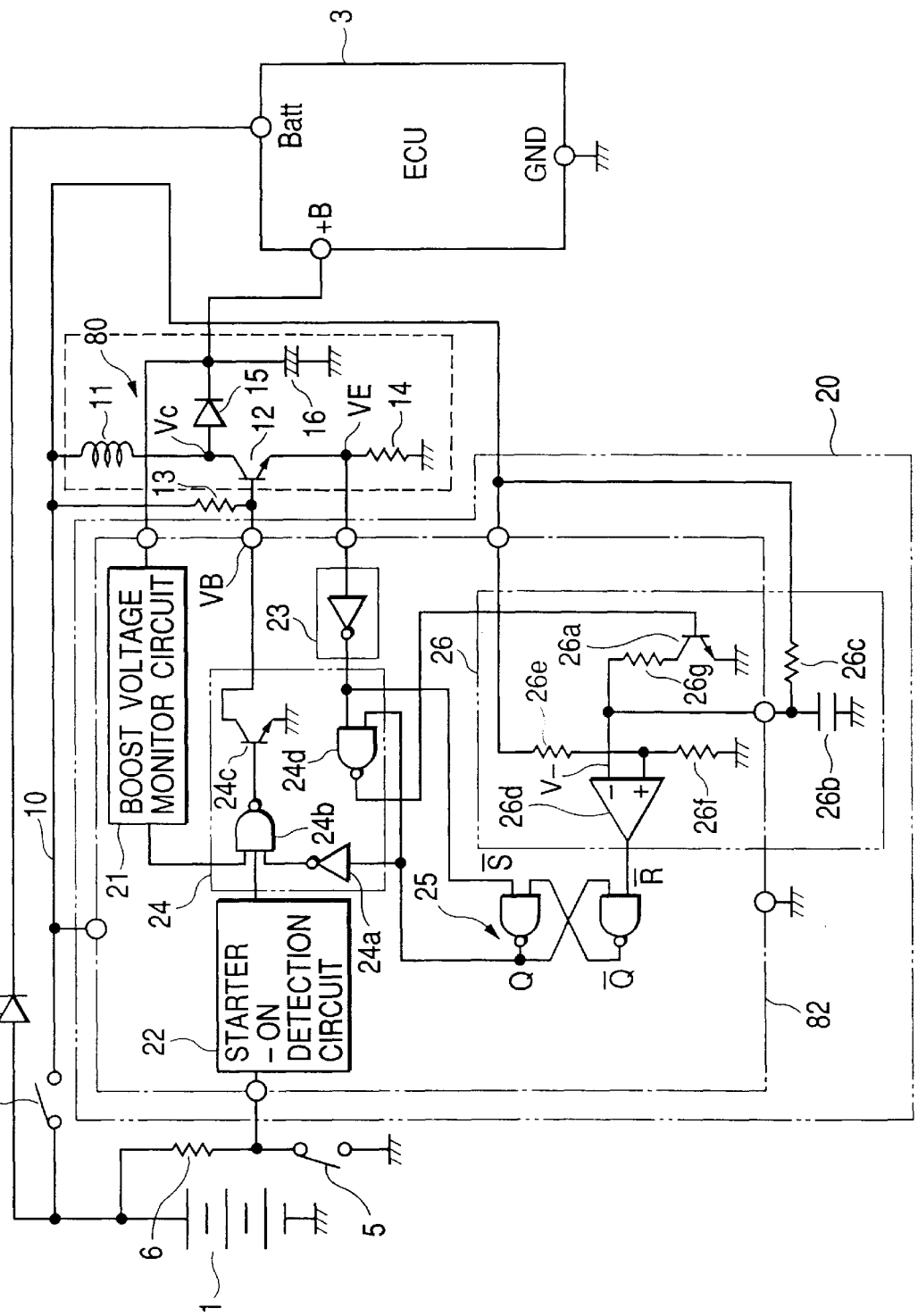
FIG. 1 is a diagram of a power supply apparatus according to an embodiment of this invention.

With reference to FIG. 1, a power supply apparatus includes a battery 1 mounted on the body of an automotive vehicle. The battery 1 is connected via an ignition switch 2 to a computer-based electronic control unit (a computer-based ECU) 3.

The ECU 3 is designed to implement control of an engine which powers the body of the automotive vehicle. The engine control includes, for example, spark timing control and fuel injection control. The ECU 3 has terminals +B, Batt, and GND. The terminal GND is grounded. The ECU 3 is powered by a voltage applied to the terminal +B. The ECU 3 includes a memory which can be powered by a voltage applied to the terminal Batt. Even when the ignition switch 2 is in its OFF position, the memory in the ECU 3 continues to be activated by the voltage at the terminal Batt so that data remains held in the memory.

The ECU 3 includes a voltage regulator which derives a rating voltage, for example, 5 V or 6 V, from a higher voltage at the terminal +B. Circuits in the ECU 3 are designed to operate at the rating voltage. The voltage regulator applies the rating voltage to the circuits in the ECU 3.

The positive terminal of the battery 1 is connected to the anode of a diode 4. The negative terminal of the battery 1 is grounded. The cathode of the diode 4 is connected to the terminal Batt of the ECU 3. Thus, the voltage of the battery 1 continues to be applied to the ECU terminal Batt regardless of whether the ignition switch 2 is in its OFF position or its ON position.

The positive terminal of the battery 1 is connected to a movable contact of the ignition switch 2. The movable contact of the switch 2 is selectively connected to and disconnected from a fixed contact thereof. When the movable contact of the ignition switch 2 is connected to the fixed contact thereof, the switch 2 assumes its ON position (its closed position). When the movable contact of the ignition switch 2 is disconnected from the fixed contact thereof, the switch 2 assumes its OFF position (its open position). The fixed contact of the ignition switch 2 is connected to a positive power supply line (a +B line) 10. When the ignition switch 2 is in its ON position, the +B line 10 is subjected to the voltage of the battery 1. The voltage at the +B line 10 is referred to as the +B voltage.

A boost dc—dc converter 80 is connected between the +B line and the terminal +B of the ECU 3. The boost dc—dc converter 80 includes a coil (an inductor) 11, an NPN transistor (a switching element) 12, a diode 15, and a capacitor 16. A first end of the inductor 11 is connected to the +B line 10. A second end of the inductor 11 is connected to the anode of the diode 15 and the collector of the transistor 12. The cathode of the diode 15 is connected to the terminal +B of the ECU 3 and a first end of the capacitor 16. A second end of the capacitor 16 is grounded. The emitter of the transistor 12 is grounded via a resistor 14. The base of the transistor 12 is connected via a bias resistor 13 to the +B line 10. The collector-emitter path of the transistor 12 is changed between a conductive state (an ON state) and a non-conductive state (an OFF state) in response to a control voltage applied to the base of the transistor 12.

In the case where the ignition switch 2 is in its ON state, when the transistor 12 assumes its conductive state, a current caused by the battery 1 flows successively through the inductor 11, the transistor 12, and the resistor 14. On the other hand, when the transistor 12 assumes its non-conductive state, a current through the inductor 11 is cut off. Accordingly, the transistor 12 serves to selectively enable a current to flow through the inductor 11 and cut off the current through the inductor 11. The resistor 14 serves to detect the current through the inductor 11. Specifically, the voltage VE across the resistor 14 is proportional to the current through the inductor 11. Thus, the voltage VE across the resistor 14 indicates the current through the inductor 11.

When the transistor 12 changes to its non-conductive state, the inductor 11 causes a counter electromotive force (a back electromotive force). The diode 15 rectifies the counter electromotive force into a dc voltage which forms a boost-resultant voltage. The dc voltage (the boost-resultant voltage) is applied from the cathode of the diode 15 to the terminal +B of the ECU 3. The capacitor 16 smooths the dc voltage at the cathode of the diode 15, that is, the boost-resultant voltage applied to the terminal +B of the ECU 3.

The positive terminal of the battery 1 is connected to a first end of a resistor 6. A second end of the resistor 6 is grounded via an engine starter switch 5. An engine starter (not shown) is activated and deactivated when the engine starter switch 5 is closed and opened, respectively. The voltage at the junction between the resistor 6 and the engine starter switch 5 assumes the ground level (that is, a low level) when the engine starter switch 5 is closed. The voltage at the junction between the resistor 6 and the engine starter switch 5 assumes a high level when the engine starter switch 5 is opened. Accordingly, the voltage at the junction between the resistor 6 and the engine starter switch 5 indicates whether the engine starter is activated or deactivated.

For example, the engine starter switch 5 is ganged with a starter motor switch (not shown) via which a starter motor (not shown) is connected to the battery 1. In this case, when the engine starter switch 5 is closed, the starter motor switch is also closed so that the starter motor is activated by the battery 1. When the engine starter switch 5 is opened, the starter motor switch is also opened so that the starter motor is deactivated.

Alternatively, the starter motor may be connected between the engine starter switch 5 and the ground.

The power supply apparatus of FIG. 1 includes a control circuit 20 which has a boost-resultant voltage monitoring circuit 21, a starter-on detection circuit 22, a current detection circuit 23, a boost control logic circuit 24, a flip-flop circuit 25, and a TOFF setting circuit 26.

The input side of the boost-resultant voltage monitoring circuit 21 is connected to the Junction among the diode 15, the capacitor 16, and the terminal +B of the ECU 3. The boost-resultant voltage monitoring circuit 21 receives the boost-resultant voltage which appears across the capacitor 16. The boost-resultant voltage monitoring circuit 21 has a section comparing the boost-resultant voltage with a predetermined voltage (equal to, for example, 10 V). When the boost-resultant voltage is equal to or higher than the predetermined voltage, the boost-resultant voltage monitoring circuit 21 outputs a low-level signal. When the boost-resultant voltage is lower than the predetermined voltage, the boost-resultant voltage monitoring circuit 21 outputs a high-level signal.

The input side of the starter-on detection circuit 22 is connected to the junction between the resistor 6 and the engine starter switch 5. The starter-on detection circuit 22 responds to the voltage at the junction between the resistor 6 and the engine starter switch 5. When the engine starter switch 5 assumes its ON position (its closed position), that is, when the engine starter is activated, the starter-on detection circuit 22 outputs a high-level signal. When the engine starter switch 5 assumes its OFF position (its open position), that is, when the engine starter is deactivated, the starter-on detection circuit 22 outputs a low-level signal. The starter-on detection circuit 22 includes, for example, a NOT gate or an inverter.

The input side of the current detection circuit 23 is connected to the junction between the transistor 12 and the resistor 14. The current detection circuit 23 responds to the voltage VE at the junction between the transistor 12 and the resistor 14, that is, the voltage VE across the resistor 14 which indicates the level (the magnitude) of the current through the inductor 11. The current detection circuit 23 serves to compare the level of the current through the inductor 11 with a predetermined level. When the level of the current through the inductor 11 is lower than the predetermined level, the current detection circuit 23 outputs a high-level signal. When the level of the current through the inductor 11 is equal to or higher than the predetermined level, the current detection circuit 23 outputs a lowlevel signal. The current detection circuit 23 includes, for example, a comparator or a NOT gate (an inverter).

The boost control logic circuit 24 is connected to the output side of the boost-resultant voltage monitoring circuit 21, the output side of the starter-on detection circuit 22, the output side of the current detection circuit 23, and the output side of the flip-flop circuit 25. The boost control logic circuit 24 is connected to the base of the transistor 12. The boost control logic circuit 24 changes the transistor 12 between its ON state and its OFF state in response to output signals of the boost-resultant voltage monitoring circuit 21, the starter-on detection circuit 22, the current detection circuit 23, and the flip-flop circuit 25.

The flip-flop circuit 25 is connected to the current detection circuit 23 and the TOFF setting circuit 26. The flip-flop circuit 25 responds to output signals of the current detection circuit 23 and the TOFF setting circuit 26.

The TOFF setting circuit 26 is connected to the +B line 10. The TOFF setting circuit 26 is also connected to the boost control logic circuit 24. The TOFF setting circuit 26 responds to an output signal of the boost control logic circuit 24. The TOFF setting circuit 26 determines an interval of time during which the current through the inductor 11 remains cut off. The TOFF setting circuit 26 is followed by the flip-flop circuit 25.

The control circuit 20 has a main portion 82 connected to the +B line 10. The main portion 82 of the control circuit 20 contains the boost-resultant voltage monitoring circuit 21, the starter-on detection circuit 22, the current detection circuit 23, the boost control logic circuit 24, and the flip-flop circuit 25. Also, the main portion 82 of the control circuit 20 contains a major portion of the TOFF setting circuit 26. Electronic devices contained in the main portion 82 of the control circuit 20 are powered by the voltage at the +B line 10.

The TOFF setting circuit 26 includes a capacitor 26b and a resistor 26c composing an external time constant circuit which extends outside the main portion 82 of the control circuit 20. A first end of the resistor 26c is connected to the +B line 10. A second end of the resistor 26c is grounded via the capacitor 26b.

The TOFF setting circuit 26 further includes an NPN transistor 26a, a comparator 26d, and resistors 26e, 26f, and 26g. The base of the transistor 26a is connected to the boost control logic circuit 24. The emitter of the transistor 26a is grounded. The collector of the transistor 26a is connected via the resistor 26g to the inverting input terminal of the comparator 26d. The inverting input terminal of the comparator 26d is connected to the junction between the capacitor 26b and the resistor 26c. Thus, the inverting input terminal of the comparator 26d is subjected to the voltage $V_-$ across the capacitor 26b. A first end of the resistor 26e is connected to the +B line 10. A second end of the resistor 26e is grounded via the resistor 26f. The non-inverting input terminal of the comparator 26d is connected to the junction between the resistors 26e and 26f. The resistors 26e and 26f compose a network for dividing the voltage at the +B line 10. The division-resultant voltage is applied to the non-inverting input terminal of the comparator 26d as a reference voltage.

The flip-flop circuit 25 has an inverting set terminal $\overline{S}$, an inverting reset terminal $\overline{R}$, and a non-inverting output terminal Q. The inverting set terminal $\overline{S}$ of the flip-flop circuit 25 is connected to the output side of the current detection circuit 23. The inverting reset terminal $\overline{R}$ of the flip-flop circuit 25 is connected to the output terminal of the comparator 26d in the TOFF setting circuit 26. The output terminal Q of the flip-flop circuit 25 is connected to the boost control logic circuit 24.

The boost control logic circuit 24 includes a NOT gate (an inverter) 24a, a three-input NAND gate 25b, an NPN transistor 24c, and a two-input NAND gate 24d. The input terminal of the NOT gate 24a is connected to the output terminal Q of the flip-flop circuit 25. The output terminal of the NOT gate 24a is connected to a first input terminal of the NAND gate 24b. A second input terminal of the NAND gate 24b is connected to the output side of the starter-on detection circuit 22. A third input terminal of the NAND gate 24b is connected to the output side of the boost-resultant voltage monitoring circuit 21. The output terminal of the NAND gate 24b is connected to the base of the transistor 24c. The collector of the transistor 24c is connected to the junction between the resistor 13 and the base of the transistor 12 in the boost dc—dc converter 80. The emitter of the transistor 24c is grounded. A first input terminal of the NAND gate 24d is connected to the output side of the current detection circuit 23. A second input terminal of the NAND gate 24d is connected to the output terminal Q of the flip-flop circuit 25. The output terminal of the NAND gate 24d is connected to the base of the transistor 26a in the TOFF setting circuit 26.

In operation of the power supply apparatus of FIG. 1, when the ignition switch 2 and the engine starter switch 5 are changed to their ON positions to start the engine, the starter-on detection circuit 22 outputs a high-level signal to the NAND gate 24b in the boost control logic circuit 24 in response to the voltage at the Junction between the resistor 6 and the engine starter switch 5. At this time, the boost-resultant voltage across the capacitor 16 is low so that the boost-resultant voltage monitoring circuit 21 outputs a high-level signal to the NAND gate 24b in the boost control logic circuit 24. Upon the change of the ignition switch 2 to its ON position, the flip-flop circuit 25 outputs a low-level signal to the NOT gate 24a in the boost control logic circuit 24. The NOT gate 24a outputs a high-level signal to the NAND gate 24b in response to the low-level signal outputted from the flip-flop circuit 25. Accordingly, at this time, all the signals fed to the NAND gate 24b from the boost-resultant voltage monitoring circuit 21, the starter-on detection circuit 22, and the NOT gate 24a are in the high-level states so that the NAND gate 24b outputs a low-level signal to the base of the transistor 24c. As a result, the transistor 24c is in its OFF state (its non-conductive state), and hence the voltage VB at the junction among the collector of the transistor 24c, the resistor 13, and the base of the transistor 12 is high in logic state. In other words, the voltage VB at the base of the transistor 12 is high.

When the voltage at the base of the transistor 12 is high, the transistor 12 is in its ON state (its conductive state) so that a current caused by the battery 1 is allowed to flow through the inductor 11, the transistor 12, and the resistor 14. As the current starts to flow through the inductor 11, the transistor 12, and the resistor 14, the voltage VE across the resistor 14 which indicates the level (the magnitude) of the current through the inductor 11 rises. The output signal of the current detection circuit 23 changes to a low level in response to the rise in the voltage VE across the resistor 14. The high-to-low change in the output signal of the current detection circuit 23 sets the flip-flop circuit 25 so that the Q output signal of the flip-flop circuit 25 changes to a high level. The NOT gate 24a outputs a low-level signal to the NAND gate 24b in response to the high-level signal outputted from the flip-flop circuit 25. Therefore, the output signal of the NAND gate 24b changes to a high-level, and the transistor 24c changes to in its ON state (its conductive state). As a result, the voltage VB at the base of the transistor 12 falls to a low level. When the voltage VB at the base of the transistor 12 goes low, the transistor 12 changes to its OFF state (its non-conductive state) so that the current through the inductor 11 is cut off. At this time, a counter electromotive force voltage (a back electromotive force voltage) Vc is caused by the inductor 11. The capacitor 16 is charged by a current corresponding to the counter electromotive force voltage Vc which flows from the inductor 11 to the capacitor 16 via the diode 15.

When the output signal of the current detection circuit 23 changes to the low level, the NAND gate 24d outputs a high-level signal to the base of the transistor 26a although the output signal from the flip-flop circuit 25 to the NAND gate 24d is in the high level. The transistor 26a changes to its ON state (its conductive state) in response to the high-level output signal from the NAND gate 24d so that the capacitor 26b is discharged.

When the transistor 12 changes to its OFF state, the current through the resistor 14 is also cut off. As a result, the voltage VE across the resistor 14 which indicates the level (the magnitude) of the current through the inductor 11 drops. The output signal of the current detection circuit 23 changes to a high level in response to the drop in the voltage VE across the resistor 14. At this time, since the output signal from the flip-flop circuit 25 to the NAND gate 24b is high, the NAND gate 24d outputs a low-level signal to the base of the transistor 26a in response to the high-level output signal from the current detection circuit 23. The transistor 26a changes to its OFF state (its non-conductive state) in response to the low-level output signal from the NAND gate 24d.

When the transistor 26a changes to its OFF state, the capacitor 26b starts to be charged by a current fed from the +B line 10 via the resistor 26c. Thus, the voltage V_across the capacitor 26b rises at a rate determined by the time constant circuit including the capacitor 26b and the resistor 26c. The comparator 26d serves to compare the voltage V_across the capacitor 26b with the reference voltage provided by the combination of the resistors 26e and 26f. When the voltage V_across the capacitor 26b exceeds the reference voltage, the output signal from the comparator 26d to the flip-flop circuit 25 changes to a low level so that the flip-flop circuit 25 is reset.

Upon the resetting of the flip-flop circuit 25, the Q output signal of the flip-flop circuit 25 changes to a low level. The NOT gate 24a outputs a high-level signal to the NAND gate 24b in response to the low-level signal outputted from the flip-flop circuit 25. Therefore, the output signal of the NAND gate 24b changes to a low-level, and the transistor 24c changes to its OFF state (its non-conductive state). As a result, the voltage VB at the base of the transistor 12 rises to a high level. When the voltage at the base of the transistor 12 goes high, the transistor 12 changes to its ON state (its conductive state) so that a current restarts to flow through the inductor 11, the transistor 12, and the resistor 14.

Thereafter, a sequence of the above-mentioned processes is iterated, and the transistor 12 is periodically changed between its ON state and its OFF state by the control circuit 20. Every change of the transistor 12 to its OFF state, a counter electromotive force voltage (a back electromotive force voltage) Vc is caused by the inductor 11. The counter electromotive force voltage Vc is rectified and smoothed by the diode 15 and the capacitor 16 into the boost-resultant voltage applied to the terminal +B of the ECU 3. The boost-resultant voltage enables the ECU 3 to normally operate when the engine starter is activated. Every setting of the flip-flop circuit in response to a change in the logic state of the output signal of the current detection circuit 23 causes the current through the inductor 11 to be cut off. Every resetting of the flip-flop circuit 25 in response to a change in the logic state of the output signal of the comparator 26d in the TOFF setting circuit 26 causes start of the flow of the current through the inductor 11.

Figure 2:
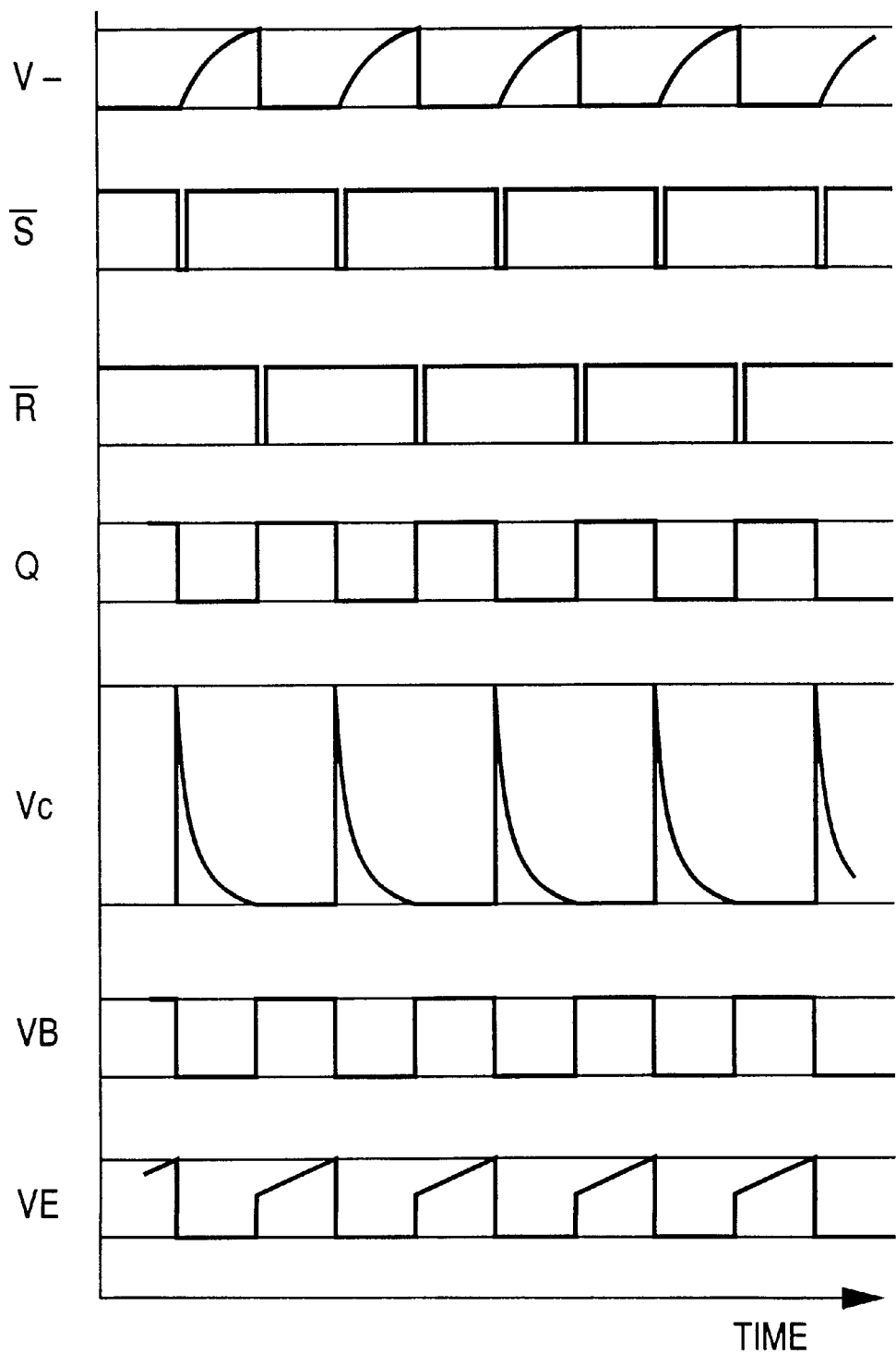
FIG. 2 is a time-domain diagram of voltages and signals in the power supply apparatus of FIG. 1.

During periodical change of the transistor 12 between its ON state and its OFF state, the voltage V_across the capacitor 26b periodically varies in a sawtooth waveform as shown in FIG. 2. In addition, other signals and voltages periodically change as follows. The signal applied to the inverting set terminal $\overline{S}$ of the flip-flop circuit 25 from the current detection circuit 23 periodically changes as shown in FIG. 2. The signal applied to the inverting reset terminal $\overline{R}$ of the flip-flop circuit 25 from the comparator 26d periodically changes between the low level and the high level as shown in FIG. 2. The Q output signal of the flip-flop circuit 25 periodically changes between the low level and the high level as shown in FIG. 2. The counter electromotive force voltage Vc periodically varies as shown in FIG. 2. The voltage VB at the base of the transistor 12 periodically changes between the low level and the high level as shown in FIG. 2. The voltage VE across the resistor 14 periodically varies in a sawtooth waveform as shown in FIG. 2.

The frequency of the switching of the transistor 12 is determined by the frequency of the periodical change of the voltage VB at the base of the transistor 12. The frequency of the periodical change of the voltage VB at the base of the transistor 12 depends on the frequency of the periodical variation in the voltage V_across the capacitor 26b. Accordingly, the frequency of the switching of the transistor 12 is determined by the time constant circuit including the capacitor 26b and the resistor 26c.

When the boost-resultant voltage across the capacitor 16 rises to or above the predetermined voltage (equal to, for example, 10 V), the signal outputted from the boost-resultant voltage monitoring circuit 21 to the NAND gate 24d changes to a low level. The NAND gate 24b outputs a high-level signal to the base of the transistor 24c in response to the low-level output signal of the boost-resultant voltage monitoring circuit 21 regardless of the logic states of the output signals of the starter-on detection circuit 22 and the NOT gate 24a. The transistor 24c changes to its ON state in response to the high-level output signal of the NAND gate 24b. Thus, the transistor 12 falls to its OFF state. The transistor remains in its OFF state and continues to be inhibited from periodically changing (switching) between its OFF state and its ON state as long as the output signal of the boost-resultant voltage monitoring circuit 21 remains in the low-level state. The inhibition of the switching of the transistor 12 causes a drop in the boost-resultant voltage across the capacitor 16. When the boost-resultant voltage across the capacitor 16 decreases below the predetermined voltage, the signal outputted from the boost-resultant voltage monitoring circuit 21 to the NAND gate 24b returns to a high level. Thus, the output signal of the NAND gate 24b is allowed to respond to the output signal of the NOT gate 24a, and the switching of the transistor 12 is restarted. The boost-resultant voltage across the capacitor 16 rises as the switching of the transistor 12 is restarted. Accordingly, the boost-resultant voltage across the capacitor 16 is provided with an upper limit determined by the predetermined voltage used in the boost-resultant voltage monitoring circuit 21.

When the engine starter switch 5 is returned to its OFF state, the starter-on detection circuit 22 outputs a low-level signal to the NAND gate 24b in the boost control logic circuit 24 in response to the voltage at the junction between the resistor 6 and the engine starter switch 5. The NAND gate 24b outputs a high-level signal to the base of the transistor 24c in response to the low-level output signal of the starter-on detection circuit 22 regardless of the logic states of the output signals of the boost-resultant voltage monitoring circuit 21 and the NOT gate 24a. The transistor 24c changes to its ON state in response to the high-level output signal of the NAND gate 24b. Thus, the transistor 12 falls to its OFF state. Then, the transistor 12 remains in its OFF state and continues to be inhibited from periodically changing (switching) between its OFF state and its ON state. In this case, the power supply voltage (+B voltage) is applied from the +B line 10 to the terminal +B of the ECU 3 via the inductor 11 and the diode 15 so that the ECU 3 continues to normally operate.

In the TOFF setting circuit 26, the capacitor 26b can be charged by a current fed from the +B line 10 via the resistor 26c as previously explained. Thus, even in the event that the +B voltage at the +B line 10 drops, the capacitor 26b can be so sufficiently charged as to provide a proper interval of time during which the transistor 12 is in its OFF state.

Figure 3:
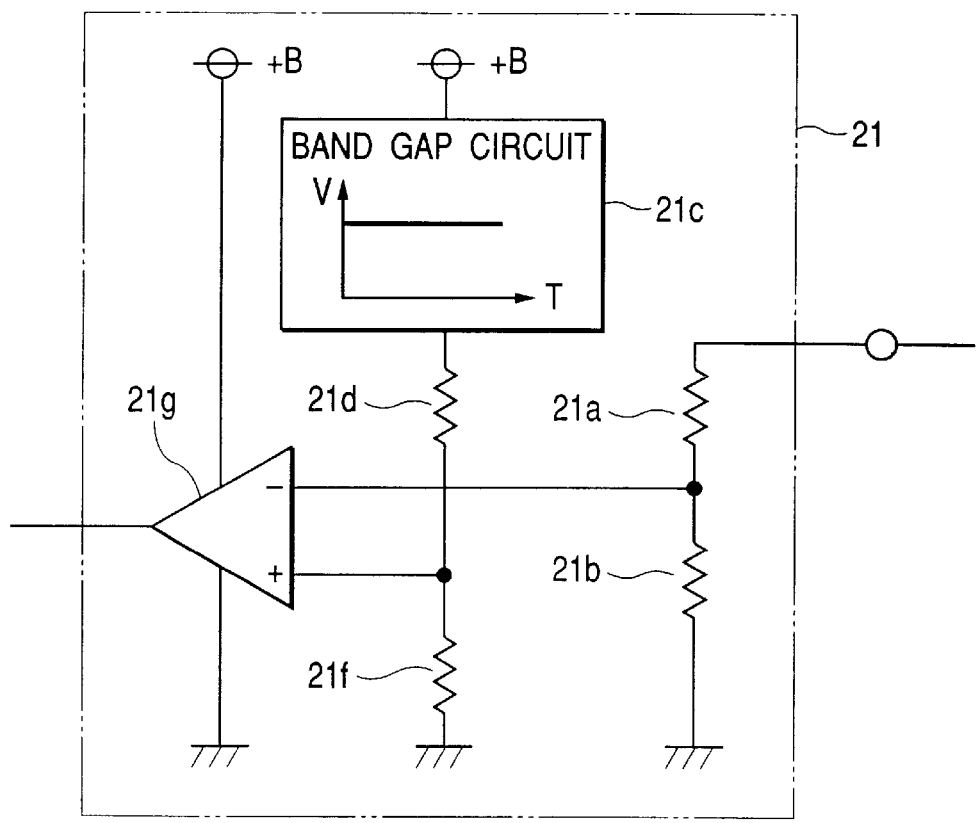
FIG. 3 is a diagram of a boost-resultant voltage monitoring circuit 21 in the power supply apparatus of FIG. 1.

As shown in FIG. 3, the boost-resultant voltage monitoring circuit 21 includes resistors 21a and 21b, a band gap circuit 21c, resistors 21d and 21f, and a comparator 21g. A first end of the resistor 21a is connected to the junction among the capacitor 16, the diode 15, and the terminal +B of the ECU 3 (see FIG. 1). A second end of the resistor 21a is grounded via the resistor 21b. The inverting input terminal of the comparator 21g is connected to the junction between the resistors 21a and 21b. The resistors 21a and 21b compose a network for dividing the boost-resultant voltage across the capacitor 16 (see FIG. 1). The division-resultant voltage is applied to the inverting input terminal of the comparator 21g. The input side of the band gap circuit 21c is connected to the +B line 10 (see FIG. 1). A first end of the resistor 21d is connected to the output side of the band gap circuit 21c. A second end of the resistor 21d is grounded via the resistor 21f. The non-inverting input terminal of the comparator 21g is connected to the junction between the resistors 21d and 21f. The band gap circuit 21c derives a voltage independent of temperature from the +B voltage at the +B line 10 (see FIG. 1). The resistors 21d and 21f compose a network for dividing the temperature-independent voltage generated by the band gap circuit 21c. The division-resultant voltage is applied to the non-inverting input terminal of the comparator 21g as the predetermined voltage. The output terminal of the comparator 21g is connected to the NAND gate 24b in the boost control logic circuit 24 (see FIG. 1). When the voltage resulting from the division of the boost-resultant voltage is equal to or higher than the predetermined voltage, the comparator 21g outputs a low-level signal. When the voltage resulting from the division of the boost-resultant voltage is lower than the predetermined voltage, the comparator 21g outputs a high-level signal.

The starter-on detection circuit 22 and the current detection circuit 23 may be similar in internal structure to the boost-resultant voltage monitoring circuit 21. In the starter-on detection circuit 22, a voltage which results from division of the voltage at the junction between the resistor 6 and the engine starter switch is compared with a reference voltage. In the current detection circuit 23, a voltage which results from division of the voltage across the resistor 14 is compared with a reference voltage.

As previously mentioned, the boost-resultant voltage monitoring circuit 21 uses the band gap circuit 21c for generating the temperature-independent voltage from which the predetermined voltage is derived. Accordingly, the operation of the boost-resultant voltage monitoring circuit 21 can be independent of temperature. For similar reasons, the operation of the starter-on detection circuit 22 and the current detection circuit 23 can be independent of temperature.

Figure 4:
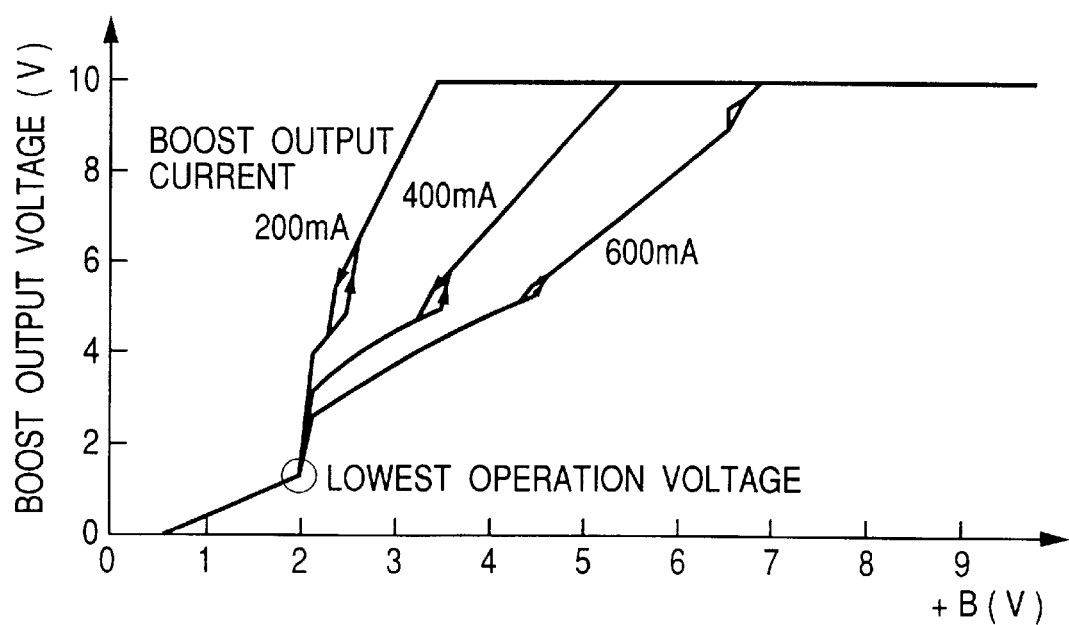
FIG. 4 is a diagram of the relation among a +B voltage, a boost output voltage, and a boost output current in the power supply apparatus of FIG. 1.

With reference to FIG. 4, the boost output voltage (the boostresultant voltage) rises as the +B voltage increases. After the boost output voltage reaches the predetermined voltage (for example, 10 V), the boost output voltage remains equal to the predetermined voltage as the +B voltage further increases. The boost output voltage increases as the boost output current decreases. FIG. 4 shows that the boost output voltage is equal to 4 V when the +B voltage is equal to 3 V in the case where the boost output current is equal to 600 mA.

What is claimed is:

1. A power supply apparatus for feeding electric power to an electronic control unit mounted on a vehicle having a battery and a starter switch, the apparatus comprising:

a power supply line connected to the battery;

a coil connected to the power supply line;

switching means for selectively enabling a current to flow through the coil and cutting off the current through the coil;

a control circuit for selectively changing the switching means between an ON state and an OFF state when the starter switch assumes an ON position;

wherein the control circuit includes current comparing means for comparing a level of the current with a first predetermined value;

wherein the switching means is turned to the OFF state when the current is equal to or greater than the first predetermined value; and wherein (i) a switching means turning-on signal is enerated when the current is lower than the predetermined value and (ii) the switching means is turned to the ON state at a predetermined time after generation of the switching means turning-on signal, and in response to the switching means turning-on signal; and smoothing means for smoothing a counter electromotive force voltage which occurs in the coil when the switching means is changed to the OFF state by the control circuit, and for generating a boost voltage from the counter electromotive force voltage and feeding the boost voltage to the electronic control unit.

2. A power supply apparatus as recited in claim 1, wherein the control circuit comprises means for inhibiting change of the switching means between the ON state and the OFF state when the boost voltage is equal to or higher than a predetermined voltage.

3. A power supply apparatus as recited in claim 1, wherein the electronic control unit has a battery terminal connected to the battery and a boost voltage terminal subjected to the boost voltage, and further comprising voltage detection means for detecting the boost voltage, and boost control means for suspending operation of the control circuit when the boost voltage detected by the voltage detection means is equal to or higher than a predetermined voltage.

4. A power supply apparatus as recited in claim 1, wherein the first predetermined value is determined by a comparison between a reference value and a comparison value; and wherein the reference value is a second predetermined value and is provided by a voltage associated with the battery and the comparison value is provided by a CR circuit charged by the voltage associated with the battery.

5. A power supply apparatus for feeding electric power to an electronic control unit mounted on a vehicle having a battery and a starter switch, the apparatus comprising:

a power supply line connected to the battery;

a coil connected to the power supply line;

switching means for selectively enabling a current to flow through the coil and cutting off the current through the coil;

a control circuit for selectively changing the switching means between an ON state and an OFF state when the starter switch assumes an ON position;

smoothing means for smoothing a counter electromotive force voltage which occurs in the coil when the switching means is changed to the OFF state by the control circuit, and for generating a boost voltage from the counter electromotive force voltage and feeding the boost voltage to the electronic control unit;

current detection means for detecting the current through the coil and outputting a signal representing the detected current through the coil;

set means for, when the output signal of the current detection means indicates that the detected current through the coil exceeds a predetermined value, being set and outputting a set output signal;

cut off means in the control circuit for changing the switching means to the OFF state and cutting off the current through the coil in response to the set output signal of the set means;

a charge circuit starting charging when the output signal of the current detection means indicates that the detected current through the coil becomes lower than the predetermined value after the current through the coil is cut off in response to the set output signal of the set means;

a comparison circuit for comparing a voltage in the charge circuit with a given voltage, and outputting an inverting output signal when the voltage in the charge circuit exceeds the given voltage;

reset output means in the set means for changing the set output signal into a reset output signal in response to the inverting output signal from the comparison circuit, and for outputting the reset output signal; and restart means in the control circuit for changing the switching means to the ON state and restarting the current flowing through the coil in response to the reset output signal from the reset output means.

6. A power supply apparatus as recited in claim 5, wherein the charge circuit starts the charging in response to the set output signal from the set means, and a signal representing that the output signal of the current detection means indicates the detected current becoming smaller than the predetermined value, and the charge circuit performs discharging when the output signal from the set means and the output signal from the current detection means are in different states respectively.

7. A power supply apparatus as recited in claim 5, wherein the set means comprises a flip-flop circuit.

8. A power supply apparatus as recited in claim 5, further comprising logic decision means for performing logic operation between the output signal from the set means and the output signal from the current detection means, and a switch in the charge circuit which changes between an ON state and an OFF state in response to an output signal from the logic decision means.

9. A power supply apparatus as recited in claim 5, further comprising a capacitor in the smoothing means, voltage detection means for detecting a voltage across the capacitor, and suspension means for suspending operation of the control circuit when the voltage across the capacitor which is detected by the voltage detection means rises to a predetermined voltage.

10. An apparatus for a vehicle having an engine starter and an electronic control unit, the apparatus comprising:

a boost dc—dc converter connected to the electronic control unit;

first means for detecting whether the engine starter is activated or deactivated;

second means for activating the boost dc—dc converter when the first means detects that the engine starter is activated; and third means for deactivating the boost dc—dc converter when the first means detects that the engine starter is deactivated;

wherein the second and third means include (i) current detecting means for detecting a current associated with the boost dc—dc converter and (ii) current comparing means for comparing a level of the current with a predetermined value;

wherein the boost dc—dc converter is deactivated when the current is equal to or greater than the predetermined value; and wherein (i) a boost dc—dc converter activation signal is generated when the current is lower than the predetermined value and (ii) the boost dc—dc converter is activated at a predetermined time after generation of the boost dc—dc converter activation signal and in response to the boost dc—dc converter activation signal.

11. An apparatus as recited in claim 10, further comprising:

fourth means for detecting a voltage outputted from the boost dc—dc converter;

fifth means for detecting whether or not the voltage detected by the fourth means is lower than a predetermined voltage; and sixth means form deactivating the boost dc—dc converter when the fifth means detects that the voltage detected by the fourth means is not lower than the predetermined voltage.

* * * * *